United States Patent [19]

Murphy

[11] Patent Number: 4,643,035
[45] Date of Patent: Feb. 17, 1987

[54] ENERGY TRANSFER AND CONSERVATION APPARATUS

[76] Inventor: Wesley T. Murphy, 94 Prospect St., Auburn, N.Y. 13021

[21] Appl. No.: 732,591

[22] Filed: May 10, 1985

[51] Int. Cl.⁴ .................. F16H 33/02; F16H 33/08
[52] U.S. Cl. .................................... 74/64; 74/572
[58] Field of Search ............ 74/406, 572, 574, 752 F, 74/64

[56] References Cited

U.S. PATENT DOCUMENTS 1,914,813  6/1933  Last ........................................ 74/64

FOREIGN PATENT DOCUMENTS

| 227120 | 10/1910 | Fed. Rep. of Germany | 74/574 |
| 1071424 | 12/1959 | Fed. Rep. of Germany | 74/574 |
| 2637095 | 2/1978 | Fed. Rep. of Germany | 74/64 |
| 2724026 | 4/1978 | Fed. Rep. of Germany | 74/64 |
| 1140635 | 7/1957 | France | 74/574 |
| 1210652 | 3/1960 | France | 74/64 |
| 2490766 | 3/1982 | France | 74/572 |
| 163966 | 11/1933 | Switzerland | 74/574 |
| 234839 | 3/1945 | Switzerland | 74/574 |

*Primary Examiner*—Kenneth J. Dorner
*Assistant Examiner*—Dirk Wright
*Attorney, Agent, or Firm*—Bruns and Wall

[57] ABSTRACT

Apparatus for mechanically transferring energy from a source to some form of energy converter that includes a series of gear sets placed in meshing contact between the source and the converter. Each gear set includes a liftoff wheel that is coupled to a transfer wheel by means of liftoff units which realign the internal forces acting upon the system when the wheels reach or exceed liftoff speed. The realignment of forces neutralizes the internal forces and conserves the amount of energy needed to sustain the transfer operation. The energy saved is accumulated in the system and used to do work.

9 Claims, 4 Drawing Figures

ENERGY TRANSFER AND CONSERVATION APPARATUS

BACKGROUND OF THE INVENTION

This invention relates to apparatus for efficiently transferring energy between a source and a load and, in particular, to apparatus for realigning the internal forces acting upon a mechanical energy transmitting system to neutralize the internal forces and to reduce the amount of energy lost from the system.

Whenever energy is transferred from one point to another, particularly in a mechanical transfer system, there is a significant loss of the total amount of energy that was originally available. Man has harnessed various forms of natural energy and has converted this energy into different forms that are more useful. For example, water power is oftentimes converted into electricity. To date, efforts to minimize the loss of energy during the conversion process have only been successful to a point. In most cases, the expense of equipment to provide further savings does not justify implimentation of the procedure.

By increasing the efficiency of the energy transfer systems, a great deal of energy can be conserved while still achieving the same amount of work or power generation at a decreased cost. As will be explained in greater detail below, the apparatus of the present invention utilizes many well known principles in a mechanical system to neutralize internal forces acting upon the system and to minimize energy losses. The energy that is saved is accumulated and stored within the system and used to do added work. The present mechanism may be compared to a fulcrum used to lever a heavy object where the fulcrum itself exercises an additional beneficial force in the levering process.

SUMMARY OF THE INVENTION

It is therefore an object of the present invention to conserve energy.

It is a further object of the present invention to provide a mechanical system for more efficiently transferring energy from a source, and in particular, a natural source and an energy converter.

Another object of the present invention is to minimize the energy losses in a mechanical transfer system.

Yet another object of the present invention is to provide a high speed mechanical energy transfer system that is capable of realigning certain internal forces acting upon the system to neutralize these forces and to further reduce energy losses in a way that the conserved energy is available to do work.

These and other objects of the present invention are attained by a mechanical energy transfer and conservation system for connecting a source of energy to an output load that includes a plurality of gear sets placed in series between the source and the load with each gear set having a first liftoff wheel and a second energy transfer wheel that are connected by means of a plurality of liftoff units that operate to realign the internal forces acting on the system when liftoff speed is attained. Energy losses are further minimized and the energy conserved is accumulated to do work. In assembly, the liftoff wheel of one gear set is meshed with the transfer wheel of the adjacent gear set in the series while the transfer wheel of the first gear set is similarly meshed to the liftoff wheel of the adjacent gear set so that each adjacent gear set is a reflection of the last. After liftoff has been achieved, the forces acting on the meshed gear are relieved thereby reducing frictional losses. The energy that is conserved is stored in the liftoff units.

BRIEF DESCRIPTION OF THE DRAWINGS

For a better understanding of these and other objects of the present invention, reference is had to the following detailed description of the invention which is to be read in conjunction with the accompanying drawings wherein.

DESCRIPTION OF THE INVENTION

Figure 1:
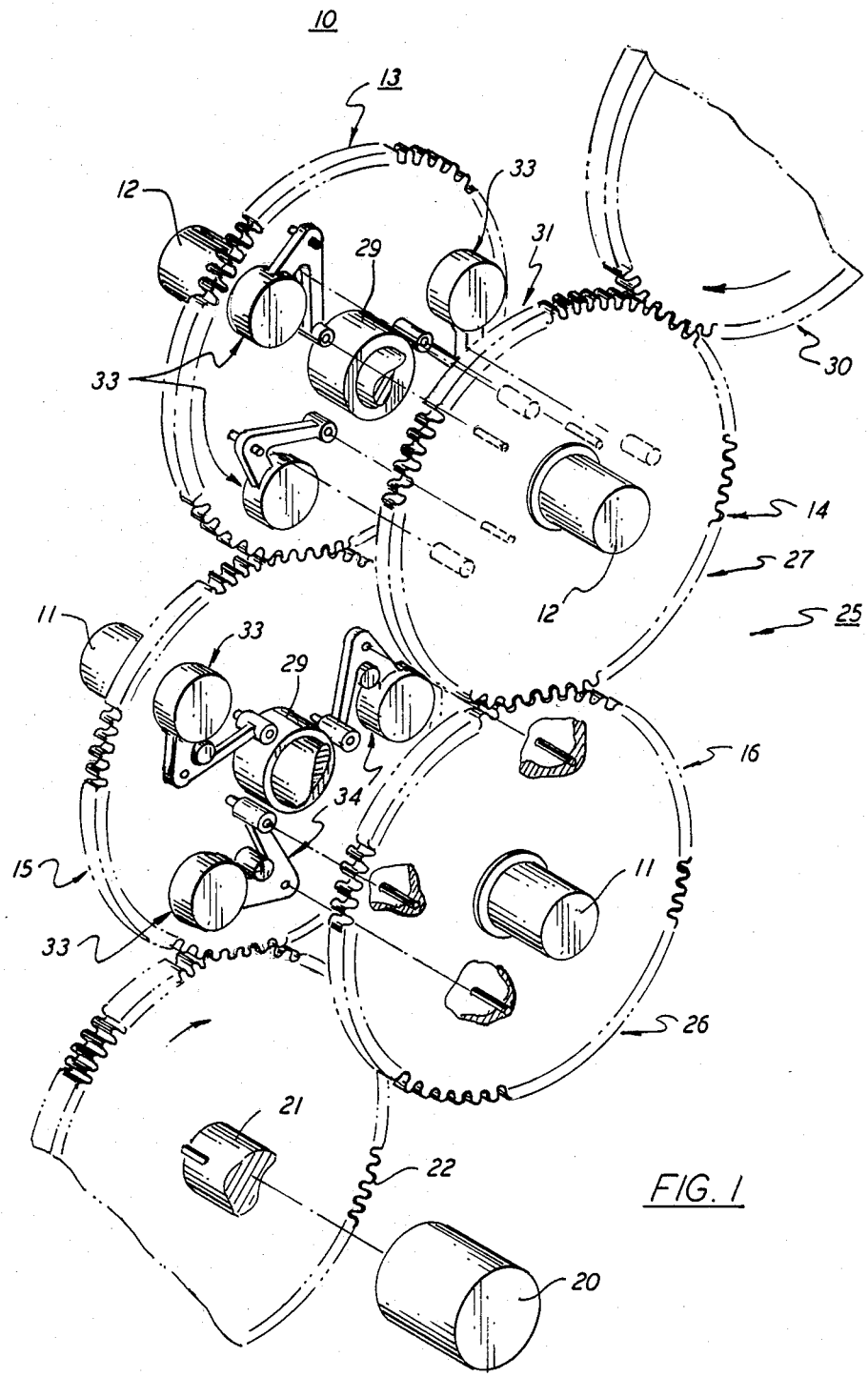
FIG. 1 is a perspective view showing one embodiment of the energy conserving apparatus of the present invention wherein two gear sets are employed in the practice of the invention.

Referring initially to FIG. 1, there is shown a system generally referenced 10 for transferring energy from a prime mover 20 to a load 30 so that the energy in transit is conserved by minimizing frictional and other internal losses and by further internally storing this energy in a manner such that it can be utilized in the system to do work. Torque and torque resistance generally found in this type of mechanical system are offset by internally generated centrifugal forces so that the internal forces acting upon the system are suspended when the system is moving at a relatively high speed. Through use of a series of weighted liftoff units, the function of which shall be explained in greater detail below, the internal forces acting upon the system are realigned at these speeds to neutralize the forces, accumulate normally wasted energy and use this energy to produce further work.

The prime mover or driver 20 illustrated in FIG. 1 is a motor and the load 30 is a gear. The driver is connected via a drive shaft 21 to a drive gear 22 which is, in turn, coupled to the load gear 30 by means of a centrifugal energy transfer and conversion mechanism, generally referenced 25, embodying the teachings of the present invention. Although the invention shall be explained with reference to this particular arrangement, it should be evident from the disclosure below that the driver can be any natural state device, such as a windmill or water wheel, and the load an energy converter, such as an electrical generator, machine drive or the like, capable of changing the natural state energy into a more usable form of power. The energy transfer and conversion mechanism also accumulates some portion of the input energy that would normally be wasted and puts it back into the system as work.

The energy transfer and conversion mechanism includes, in this embodiment of the invention, two sets of mating gears which will herein be referred to as a first gear set 26 and a second gear set 27. The first gear set is mounted for rotation upon idler shaft 11 while the second gear set is similarly mounted for rotation upon a second idler shaft 12. The two idler shafts may be supported by any suitable means in parallel alignment to hold the gear sets in meshing engagement as illustrated in FIG. 1. A spacer 29 is also mounted upon each idler shaft between the companion gears in each set to hold the gears separated in assembly and thus provide a transfer region 31 between the gears in which are positioned liftoff units 33-33.

Each gear set includes a liftoff wheel and a cooperating transfer wheel which are operatively connected across the transfer region by the liftoff units so that the internal forces acting on the gear set become realigned after liftoff speed has been attained. The wheels are coupled by means of liftoff units 33, the function of which will be explained in greater detail below. The liftoff wheel contained in first gear set 26 will herein be referred to as input wheel 15 and its companion as transfer wheel 16. The second downstream gear set 27 includes a liftoff wheel, referred to as output wheel 14, and a companion transfer wheel 13. As shown, input wheel 15 is coupled in meshing engagement with transfer wheel 13 while the output wheel 14 is likewise coupled in meshing engagement with transfer wheel 16. It should be further noted that the input wheel is coupled to the drive gear 22 and the output wheel 14 is coupled to the load gear 30 to complete the energy transfer and conversion circuit. As noted above, each gear set is held in meshing engagement with the other gear set so that they turn in concert to deliver energy from the prime mover to the load. In assembly, each gear in the two sets has the same pitch diameter, and correspondingly, the same number of teeth so that the wheels all turn at the same speed when the energy transfer and conservation mechanism is put in motion.

Figure 2:
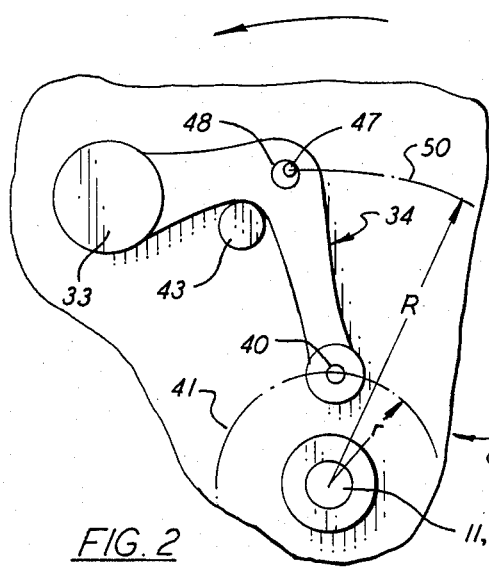
FIG. 2 is an enlarged side elevation showing a liftoff unit used in the present invention showing the arm of the unit resting upon a stop prior to its being lifted from said stop.
Figure 3:
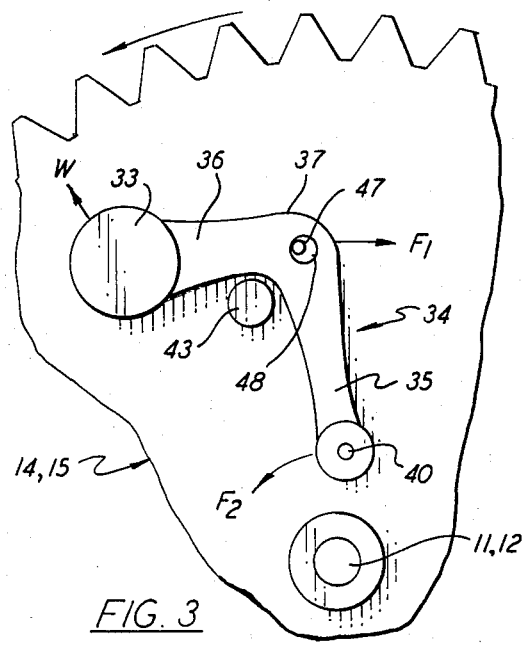
FIG. 3 is an enlarged side elevation similar to that shown in FIG. 2 further illustrating the arm lifted away from the stop upon liftoff speed being attained.

With further reference to FIGS. 2 and 3, the operation of the liftoff units 33-33 shall be explained in greater detail. In this embodiment of the invention three identical units are situated in the noted transfer region 31-31 between the wheels of each gear set. Each unit includes an L-shaped or boomerang like arm 34 containing a pair of elongated members 35 and 36 that are joined at an elbow 37. A cylindrical weight 38 is integrally mounted on the distal end of the arm. The proximal end of each arm is rotatably mounted in the liftoff wheel by means of a pivot pin 40 (FIGS. 2 and 3). The pivot pins 40-40 relating to a gear set are equally spaced about the circumference of a mounting circle 41 (FIG. 2) having a radius (R) located at the center of the support shaft 11 or 12.

Normally, when the system is at rest or is turning at a relatively low speed, the weight at the distal end of the arm tends to rotate in a counterclockwise direction as seen in FIGS. 1 and 2 or in a direction opposite the direction of rotation of the liftoff wheel. A stop 43 which is also secured in the liftoff wheel is positioned to seat against the elbow of the arm and prevent the arm from rotating in a counterclockwise direction. The stop and the pivot pin, both being secured to the liftoff wheel, push against the arm and thus hold the arm in a "normal" position when the liftoff wheel is turning at a speed that is less than the liftoff speed.

A second transfer pin 47 is received in a hole 48 formed in the arm of the liftoff unit at the elbow 37 thereof. The hole 48 is accurately machined and located in the arm to allow the arm to rotate slightly about the pivot pin when liftoff speed is achieved. Although shown exaggerated in FIGS. 2 and 3, the actual clearance between the arm and the stop at liftoff is just sufficient enough to allow the weight of the arm to be lifted from the stop. The force normally acting between the arm and the stop is now shifted to the transfer pin. This, in turn, causes a force F1 to be applied to the transfer pin 47 which is transmitted by the pin to the transfer wheel. Three transfer pins 47-47 are contained in each gear set with the pins being equally spaced about a mounting circle 50 located a distance R from the center of the support shaft. The force F1 is equal and opposite to the force F2 acting on pin 40 with the amount of force being a function of the weight W.

As should now be evident, at the time of liftoff, the weighted arms of the liftoff units move off the stops and into contact with the transfer pins thus realigning the internal force acting upon the system. This realignment of forces neutralizes the torque on the system as shown diogramatically by vectors F1 and F2 in FIG. 3. At the same time, the meshing gears responding to the neutralization of forces become more or less suspended in position as they move in unison through each revolution. Accordingly, little or no friction is generated between the gear teeth thereby resulting in a considerable conservation of the energy in transit. The liftoff units, acting in the same manner as flywheels begin to accumulate the conserved energy which is reflected in more energy being transferred to load.

Figure 4:
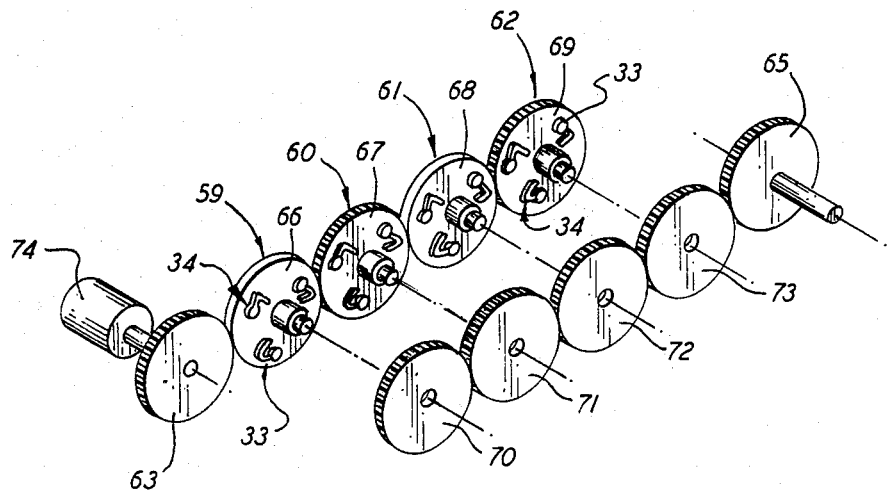
FIG. 4 is a schematic perspective view of another embodiment of the invention.

While the present invention has been described with reference to an energy transfer and conservation mechanism utilizing two gear sets each having three liftoff units, the invention is not necessarily limited to this particular arrangement of element. Any number of liftoff units that can be conveniently mounted between the gears in a set may be herein utilized which will function to achieve liftoff at some desired or predetermined speed. Similarly, the number of gear sets may be altered between the drive and the load. FIG. 4 illustrates a system in which four gear sets 59-62 are interposed between a drive gear 63 turned by motor 74 and a load gear 65. Gears 66-69 represent the liftoff wheels while gears 70-73 represent the transfer wheel in the various gear sets. As explained above, the liftoff wheel in one set is always in meshing contact with the transfer wheel of the next adjacent set and vice versa so that each adjacent set is a reflection of its neighbor. Each liftoff wheel contains a series of liftoff units 33-33 that function in the same manner as explained above. Accordingly, regardless of the number of gear sets utilized, the internal forces will be neutralized at liftoff and the amount of energy lost will be minimized with the conserved energy again being accumulated in the system where it can be used to do useful work.

While this invention has been described with reference to the structure disclosed herein, it is not confined to the details set forth and this application is intended to cover any modifications or changes as may come within the scope of the following claims.

I claim:

1. Apparatus for minimizing the loss of energy in transit that includes
    a pair of parallel support shafts,
    a first gear set having an input wheel and a transfer wheel that are spaced apart along one of said shafts to provide a work region therebetween,
    a second gear set having an output wheel and a transfer wheel that are spaced apart along the other shaft to provide a work region therebetween,
    said input wheel of said first gear set meshing with the transfer wheel of the second gear set and the output wheel of said second gear set meshing with the transfer wheel of the first gear set, a plurality of pivot pins mounted for rotation within the input and output wheels, said pivot pins being located along a small diameter circle on said wheels and extending into the work zone between the gear sets, a plurality of transfer pins mounted for rotation within each of the two liftoff wheels said transfer pins being positioned along a large diameter circle on said liftoff wheels, said large diameter circle being greater than the said small diameter circle, said transfer pins extending into the work zone between the gear sets, a plurality of L-shaped support arms each having two elongated support members that are joined at an elbow, each of said arms supporting a weight at its distal end and being pivotally mounted at its proximal end by one of said pivot pins, one of said transfer pins being loosely received in each of said arms at the elbow thereof whereby the arm is permitted to pivot slightly about the pivot pin, a plurality of stops mounted in the input and output wheels for rotation therewith said stops extending into the work zone, between gear sets, each of said stops being further arranged to engage one of said support arms and support the arm against rotation about the pivot pin when the wheels are turning below a predetermined speed, and a drive means for turning the wheel at a speed at which the said arms lift off the said stops to realign the forces acting on the wheels.

2. The apparatus of claim 1 wherein each wheel has the same pitch diameter whereby the wheels turn at the same speed.

3. The apparatus of claim 1 wherein the arms are equally spaced about the circumference of the wheels.

4. The apparatus of claim 1 wherein the drive means is connected to the input wheel and a load is connected to the output wheel whereby input energy is transmitted from the input to the load.

5. The apparatus of claim 2 wherein the diameter of the small circle is about one-third the outside diameter of the wheels and the diameter of the large circle is about two-thirds the outside diameter of the wheels.

6. The apparatus of claim 1 wherein the stop engages the arm at the inside of the elbow.

7. The apparatus of claim 1 wherein the weight is positioned outwardly from the elbow in the direction of the rotation of the wheel.

8. Apparatus for minimizing the loss of energy which is in transit that includes a plurality of gear sets that are connected in series, each gear set including a liftoff wheel and a transfer wheel that are mounted for rotation upon a common shaft in spaced apart relationship to provide a transfer zone therebetween, a plurality of pivot pins mounted for rotation with each liftoff wheel, said pivot pins being positioned along a small diameter mounting circle and extending outwardly into the transfer region, a plurality of transfer pins mounted for rotation with each transfer wheel, said transfer pins being positioned along a large diameter mounting circle and extending outwardly into the transfer region, a plurality of L-shaped liftoff arms each having two elongated members joined at an elbow and a weight mounted at the distal end of the arm and one of said pivot pins pivotally supported in the proximal end thereof, one of said transfer pins being loosely supported at the elbow of each arm to permit the arm to rotate slightly about the pivot pin, a plurality of stops mounted in the liftoff wheel for rotation therewith, each stop extending into the transfer region and being arranged to engage one of said support arms to hold the arm against rotation about the pivot pin when the liftoff wheel is turning at a speed below a predetermined speed, the gear sets being connected in series with the liftoff wheel of one set being in mesh with the transfer wheel of the next set in the series and the transfer wheel of said one set also being in mesh with the liftoff wheel of the said next set, and a drive means for turning the wheels at a speed at which the arms lift off the stops whereby the internal forces acting upon the wheels are realigned.

9. The apparatus of claim 8 wherein the drive means is connected to the first liftoff wheel in the series and a load is connected to the last liftoff wheel in the series.

* * * * *